United States Patent [19]

Kawa

[11] 3,902,160

[45] Aug. 26, 1975

[54] PATTERN RECOGNITION SYSTEM

[75] Inventor: Ryuichi Kawa, Yokohama, Japan

[73] Assignee: Ricoh Co., Ltd., Tokyo, Japan

[22] Filed: Dec. 28, 1973

[21] Appl. No.: 429,181

[30] Foreign Application Priority Data

Dec. 31, 1972 Japan .................................... 47-309

[52] U.S. Cl. ............. 340/146.3 AQ; 340/146.3 MA

[51] Int. Cl.[2] ............................................ G06K 9/10

[58] Field of Search ........... 340/146.3 MA, 146.3 R, 340/146.3 AQ, 146.3 S; 444/1

[56] References Cited

UNITED STATES PATENTS

| | | | |
|---|---|---|---|
| 3,688,267 | 8/1972 | Iijima et al. | 340/146.3 MA |
| 3,701,095 | 10/1972 | Yamaguchi et al. | 340/146.3 MA |
| 3,810,093 | 5/1974 | Yasuda et al. | 340/146.3 MA |

OTHER PUBLICATIONS

Glucksman, "Multicategory Classification of Patterns . . . ," IEEE Transactions on Computers, Dec., 1971, pp. 1593–1598.

*Primary Examiner*—Leo H. Boudreau
*Attorney, Agent, or Firm*—Cooper, Dunham, Clark, Griffin & Moran

[57] ABSTRACT

A two-dimensional input pattern to be recognized is converted into a pattern of $n$ analog voltages representing the peculiar features of said pattern. Next there is established one-to-one correspondence between the two-dimensional input pattern and a point in an N-dimensional Euclidean Space whose coordinates correspond to said $n$ analog voltages. The distances in said Euclidean between the two-dimensional input pattern space and standard patterns in storage for identification of a desired number of patterns are obtained based upon a relation in accord with the present invention. The two-dimensional input pattern is identified by the standard pattern whose distance to the two-dimensional input pattern is the minimum such distance.

6 Claims, 3 Drawing Figures

PATTERN RECOGNITION SYSTEM

BACKGROUND AND SUMMARY OF THE INVENTION:

The present invention relats to a pattern recognition system and more particularly an optical pattern recognition system for optically scanning character patterns printed or written by hand.

It is a well known fact that when an optical pattern recognition device reads the characters and numerals printed upon the documents, the input character pattern varies over a wide range due to stains, blots and the like on the documents and due to poor printing. In the case of characters written by hand, the input character pattern further varies depending upon the types of writing instruments and styles of writing so that pattern recognition becomes extremely difficult. There have been proposed various methods for normalizing the input character patterns obtained by optical scanning before they are transferred into a unit which compares the newly read patterns with the patterns in storage, but they are not satisfactory in practice.

In order to identify the newly input character patterns which are deviate somewhat from the standard character patterns in storage, there has been devised and demonstrated a method in which deviating character patterns are also stored in addition to the standard character patterns. This method has a distinct defect in that several such deviating standard character patterns must be stored for the same deviation tendency. Furthermore there must be stored the character patterns which are formed by the combination of the character patterns with one tendency of deviation with those with another tendency. Therefore, a great number of deviating character patterns must be stored in a character recognition device, thus resulting in a corresponding great cost.

Furthermore, there has been devised and demonstrated a method in which the component patterns of the tendency of deviation of read character patterns are stored so that even when deviation of the read or perceived character pattern in any one direction occurs, the distance between the deviating perceived character pattern and the standard pattern may not vary. That is, a number of J components in the J directions which are mutually perpendicular are prepared. First the distance D between the read character pattern and the standard pattern is obtained so that the deviation components $D_1, D_2, \ldots$ and $D_j$ in the J directions are obtained. The distanced DX between the read character pattern and the standard character pattern is obtained based upon the following equation:

$$DX = \sqrt{D^2 - D_1^2 - D_2^2 \ldots - D_j^2} \quad (1)$$

Even when the read or input character pattern deviates in J direction, the distance DX is always constant. The above method, however, has a distinct defect in that a number of (J+2) squaring operations are required. Therefore, the adjustment of a pattern recognition device is extremely difficult, the operation is not stable, and the cost is high.

One of the objects of the present invention is therefore to provide a pattern recognition system which may overcome the above problems, may be stable in operation and low in cost and may identify deviating character patterns. More particularly, the object of the present invention is to provide an improved pattern recognition system of the type in which the distance between a read input pattern and each of a plurality of standard patterns is obtained so that the read input pattern may be identified by the standard pattern that has the minimum distance to the input pattern.

The underlying principle of the present invention will be described hereinafter. First a standard pattern is established from a great number of patterns or pattern styles of one character or category which are printed or written by hand. It is assumed that the standard character pattern thus established has an ordered n-tuple $(x_1, x_2, \ldots, x_n)$ of numbers so that there may be established a one-to-one correspondence between the standard character pattern and a point in the N-dimensional Euclidean space. Next let cartesian coordinate systems with equal scales be established on each of $n$ pairwise mutually perpendicular lines intersecting in the common origin, that is the point of said standard character pattern, and label the lines $R_1, R_2, \ldots$, and $R_J$. The axis $R_1$ is directed in the direction in which the extension or deviation of a set of said large number of patterns of one character is minimum. The axis $R_2$ is directed in the direction in which the extension or deviation of said set is a second minimum. In like manner, the axes $R_3, R_4, \ldots, R_J$ are directed. Let designate the standard deviations of the projections of said great number of patterns on the axes $R_1, R_2, \ldots$, and $R_J$, as $q_1, q_2, \ldots$, and $q_J$. The standard deviations $q_1, q_2, \ldots$ and $q_J$ satisfy the following relation:

$$q_1 \leq q_2 \leq \ldots \leq q_J$$

Let the projections of a read input pattern upon the above axes be $D_1, D_2, \ldots$, and $D_J$. Then the distance DD between the read input pattern and the standard character pattern may be obtained by the following equation:

$$DD = \sum_{i=1}^{J} \frac{|D(i)|}{q(i)} \quad (2)$$

From eq. (2), it is seen that the overall distance DD becomes shorter when the projections on the axes of smaller standard deviations are smaller even when the projections on the axes with larger standard deviations are larger, so that the input pattern is identified as close or near to the standard character pattern. When the case is opposite to the above case, the input pattern is identified as a pattern of another character or category. In order to carry out the calculation of Eq. (2), diodes, resistors and operational amplifiers are required, but a pattern recognition device provided in accord with present invention is very reliable in operation and low in cost.

The above and other objects, features and advantages of the present invention will become more apparent from the following description of one preferred embodiment thereof taken in conjunction with the accompanying drawing.

Figure 1:
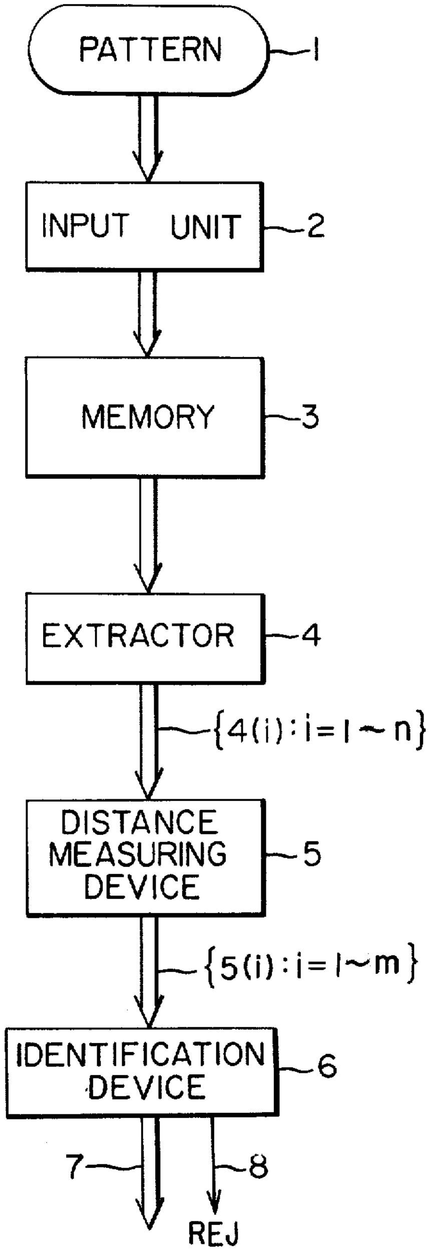
FIG. 1 is a block diagram of a pattern recognition system in accordance with the present invention.

DESCRIPTION OF THE PREFERRED EMBODIMENT:

Referring to FIG. 1, a character pattern printed or written upon a document or card is designated by 1, and is sensed by an input or sensing unit 2 in such a way that black elementary areas may be converted into electrical digital signals 1 while white elementary areas, into electrical digital signals 0 and that these converted digital signals 1 and 0 are quantized by any conventional method. The output of the input or sensing unit is transferred into a two-dimensional memory 3. The character pattern stored in the two-dimensional memory 3 will be referred to as "input character pattern" in this specification. The input device 2 which is adapted to sense a character pattern and to convert it into electrical video digital signals comprises, for instance, a flying spot scanner or an array of photoelectric cells and a quantizer for processing the output of the flying spot scanner or the array of photoelectric cells. The two-dimensional memory 3 comprises, for instance, a plurality of shift registers arrayed two -dimensionally. Since both the input device 2 and the two-dimensional memory 3 are well known in the art, further description will not be made in this specification.

A pattern component extracting unit 4 is adapted to divide the input character pattern stored in the two-dimensional memory 3 into a number of $n$ pattern components and to convert a number of $n$ pattern component signals, which represents a number of $n$ pattern components respectively, into a number of $n$ analog voltages in such a way that the pattern components represented by the analog voltages are not correlated with each other. The pattern component extracting device 4, which comprises, for instance, a plurality of linear adders, is well known to the art so that the detailed description thereof will not be made in this specification.

The number of $n$ analog voltages are provided at a number of N output terminals $4_1$, $4_2$, . . ., and $4_n$, respectively, so as to be transferred into a signal distances measuring device 5 which is adapted to measure the signal distance between $n$ analog voltages and $m$ standard or reference character patterns based upon Eq. (2). The outputs of the signal distance measuring device 5 are transmitted from output terminals $5_1$, $5_2$, . . ., and $5_m$ to an identification device 6, which is adapted to obtain the minimum signal distance in order to transmit the corresponding standard character pattern on an output line 7. However, when the ratio of the minimum signal distance to the next minimum distance is less than a predetermined value, a signal representing rejection is transmitted through a rejection line REJ.

Let designate n analog voltages obtained from the pattern component extracting device 4 depending upon the character pattern 1 by $x_1$, $x_2$, . . ., and $x_n$. Then the input character pattern is given by a set of $$x_1, x_2, \ldots, x_n$$

and is taken as the coordinates of an point of an N-dimensional hypercube or space, which will be referred as "N-dimensional pattern component space or hypercube" in this specification. Then, the input character pattern is a point given by the coordinates $x_1$, $x_2$, . . ., and $x_n$ in the N-dimensional pattern component space. The input character pattern X is given by $$X=(x_1, x_2, \ldots, x_n)$$

and the standard character pattern Y is given by $$Y=(y_1, y_2, \ldots, y_n).$$

Vectors $P_1$, $P_2$, . . ., and $P_J$, which are in parallel with the axes $R_1$, $R_2$, . . ., and $R_J$ which intersect each other at right angles at an origin or a point given by Y and whose magnitude is unit, are given by $$P_1=(P(1,1), P(2,1), \ldots, P(n,1))$$
$$P_2=(P(1,2), P(2,2), \ldots, P(n,2))$$
$$\vdots$$
$$P_J=(P(1,J),P(2,J), \ldots, P(n,J))$$

Among these vectors, the following relation is held:

$$\langle P(i), P(j)\rangle = \delta_j^i = \begin{cases} 1 & (i=j) \\ 0 & (i\neq j) \end{cases}$$

wherein $\langle P(i), P(j)\rangle$ is a scalar product of the vectors $P(i)$, and $P(j)$, and $$\langle P(i), P(j)\rangle=P(1,i)\cdot P(1,j)+P(2,i)\cdot P(2,j)+\ldots+P(n,i)\cdot P(n,j)$$

Figure 2:
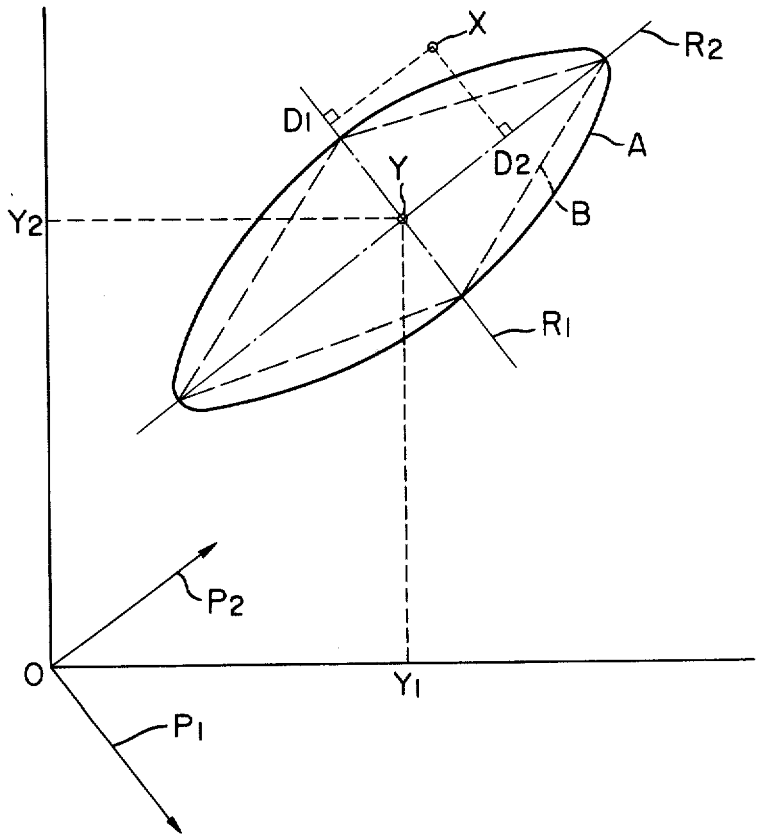
FIG. 2 is a view used for the explanation of the measurement of the distance between a read pattern and a standard pattern in storage in accordance with the present invention.

FIG. 2 shows an example of two-dimensional pattern component space, in which Y represents the standard character pattern; $R_1$ and $R_2$, axes; $P_1$ and $P_2$, unit vectors; A, an ellipse in which character patterns belonging to the standard character pattern Y are distributed with the same probablity; and B, a parallelogram in which the character patterns whose distances from the standard character pattern Y obtained based upon Eq. (2) are same, are distributed. That is, the area A is approximated by the area B.

Figure 3:
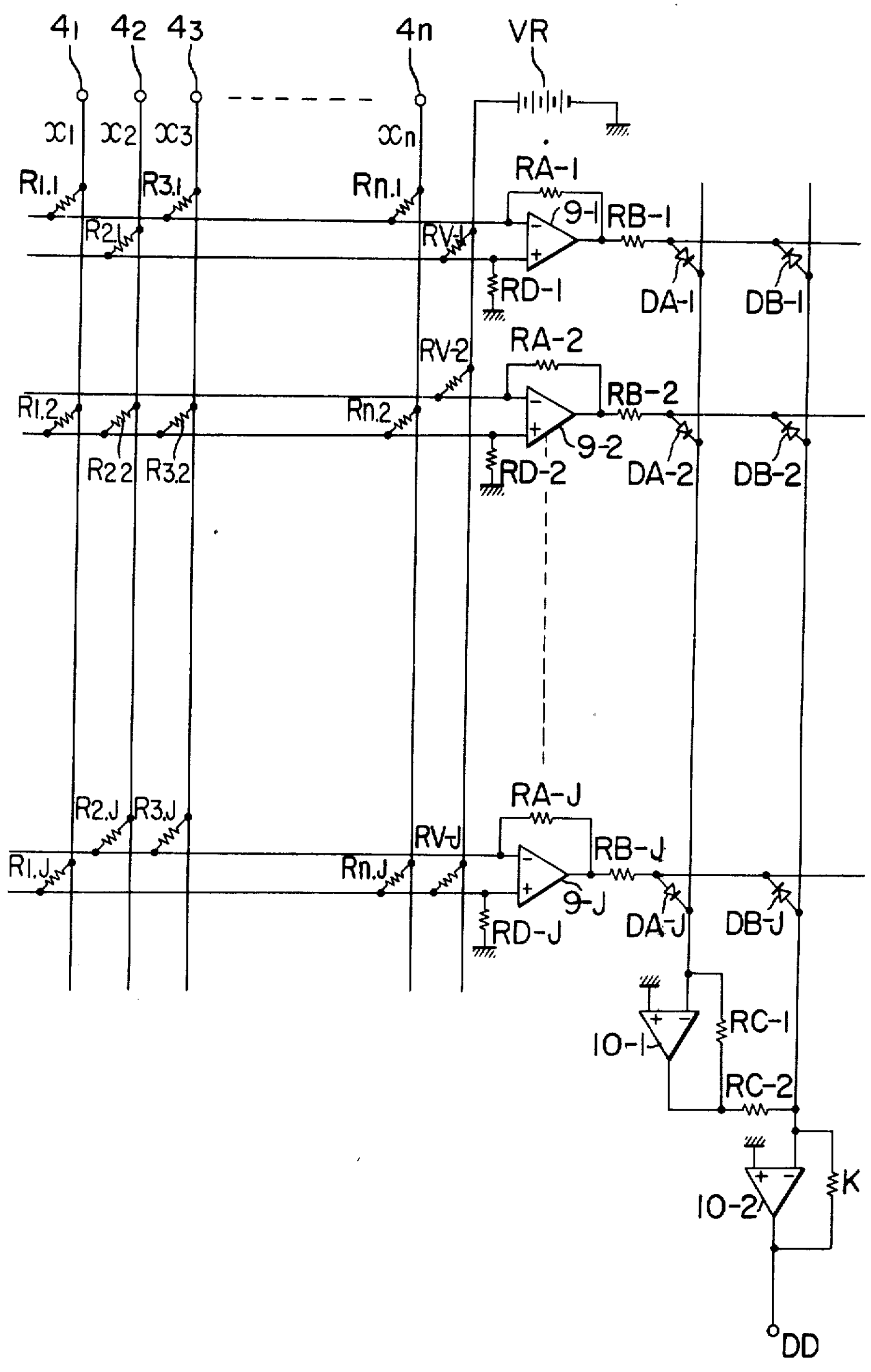
FIG. 3 is a circuit diagram of a device adapted to measure said distance.

Next referring to FIG. 3, one embodiment of the signal distance measuring device in accordance with the present invention will be described. The pattern component extracting device 4 provides the analog voltages $x_1$, $x_2$, . . . and $x_n$ at their output terminals $4_1$, $4_2$, . . . and $4_n$, respectively, some of which in turn are applied a first adder-subtractor comprising resistors R(1, 1), R(2, 1), . . ., R($n$, 1) RD-1, and RA-1 and an operational amplifier 9-1. When the operational amplifier 9-1 provides a positive output, the latter is applied through a resistor RB-1 and a diode DA-1 to a negative input of an operational amplifier 10-1. On the other hand, when the negative polarity output is provided, the current flows from the negative input of the operational amplifier 10-2 through the diode DB-1 and the resistor RB-1. In like manner, the output of the $j$-th adder-subtractor comprising resistors R(1, J), R(2, J), . . ., and R($n$, J), RD-J and RA-J and an operational amplifier 9-J is applied to the operational amplifier 10-1 through a resistor RB-J and a diode DA-J or the adder-subtractor absorbs the current from the operational amplifier 10-2. Predetermined bias voltages are applied through resistors RV-1, RV-2, . . ., and RV-J to the operational amplifiers 9-1, 9-2, . . ., and 9-J.

The resistors are so selected as to satisfy the following relations:

R=RA-1=RA-2= . . . =RA-J
R=RC-1=RC-2=RC-3

$$\left\{\begin{array}{l} \frac{R}{RB-1} = \frac{1}{q(1)} \\ \frac{R}{RB-2} = \frac{1}{q(2)} \\ \vdots \\ \frac{R}{RB-J} = \frac{1}{q(J)} \end{array}\right.$$

$$\left\{\begin{array}{l} P(1)=(R/R(1,1), R/R(2,1), \ldots, R/R(n,1)) \\ P(2)=(R/R(1,2), R/R(2,2), \ldots, R/R(n,2)) \\ \vdots \\ P(J)=(R/R(1,J), R/R(2,J), \ldots, R/R(n,J)) \end{array}\right.$$

$$\left\{\begin{array}{l} \frac{R}{RV-1} VR = -\langle P(1), Y\rangle \\ \frac{R}{RV-2} VR = -\langle P(2), Y\rangle \\ \vdots \\ \frac{R}{RV-J} VR = -\langle P(J), Y\rangle \end{array}\right.$$

The resistors RD-1, RD-2, . . ., and RD-J are so selected as to balance the adder-subtractors, and the resistance R may be arbitarily selected. When the resistances of the resistors RV-1 to RV-J and R(1, 1) to R(*n*, J) are negative, the resistors having the values equal to the absolute values of the resistors RV-1 to RV-J and R(1, 1) to R(*n*, J) are connected to the negative inputs of the operational amplifiers 9-1 to 9-J.

Therefore, the output voltage DD of the operational amplifier 10-2 is given by $$DD = \sum_{i=1}^{J} \left| (\langle P(i), X\rangle - \langle P(i), Y\rangle)/q(i) \right|$$

Hence, $$DD = \sum_{i=1}^{J} \left| \langle P(i), X - Y\rangle / q(i) \right| \quad (4)$$

wherein the scaler product $\langle P(i), X-Y\rangle$ within the signs of the absolute value represents the projection D(*i*) upon the axis R(*i*).

Eq. (4) shows that the calculation of Eq. (2) is carried out by the circuit shown in FIG. 3.

What is claimed is:

1. A pattern recognition system including means for converting an input pattern into corresponding electrical signals defining a point X in N-dimensional space, and comprising:

means for obtaining signals representing each of the distances DD(*k*) between said point X and each of a plurality of point Y(*k*) in the same space (where *k*=1,2, . . . ,K) by summing, for each point Y(*k*), the ratios between the absolute values of signals D(*i*) each representing the projection of said point X on the corresponding axis R(*i*) originating at the point Y(*k*) and corresponding signals *q*(*i*) each representing the standard deviation along the corresponding axis R(*i*) of the electrical signals corresponing to each of a plurality of patterns classified in the category of a single standard pattern (where *i*=1,2, . . . ,J), each single standard pattern corresponding to a different point Y(*k*); and means for comparing the signals representing the distances DD(*k*) to find the least distance DD(*k*), said least distance indicating the correspondence between the input pattern and the standard pattern of the corresponding point Y(*k*).

2. A system as in claim 1 including means for comparing the difference between the least distance DD(*k*) and the next least distance DD(*k*) with a selected threshold signal and for providing a rejection signal if said difference is below the threshold, said rejection signal indicating that the input pattern can not be unambiguously associated with a single standard pattern.

3. A system as in claim 1 wherein each of the means for finding the signal representing the distance between the point X and a single point Y(*k*) in said N-dimensional space comprises:

an adder-subtractor for each of the J axis, each adder-subtractor comprising a resistance network and an operational amplifier, said resistance network receiving the electrical signals representing the input pattern and being connected to the input of the corresponding operational amplifier, the resistance network component values and the operational amplifier characteristic being selected to provide at the amplifier output the signal representing the projection D(*i*) on the corresponding axis R(*i*);

for each adder-subtractor, an output resistor connected to the output thereof and having a value corresponding to the corresponding standard deviation *g*(*i*); and means for summing the absolute values of the electrical signals at said output resistors, the resulting sum representing the distance DD(*k*) between the point X and the single point Y(*k*).

4. A system as in claim 3 wherein the means for summing the electrical signals at said output resistors comprises:

a first and a second operational amplifier;

a first output line connected to the input of the first amplifier and a second output line connected to the output of the first amplifier through a selected resistor and to the input of the second amplifier;

a first set of diodes connecting the output resistors to the first output line and allowing current flow in the same single direction; and a second set of diodes connecting each of said output resistors to the second output line and allowing current flow in the same single direction which is opposite the current flow direction for the first output line.

5. A pattern recognition system comprising a. an input unit adapted to read an input pattern to be identified so as to provide quantized video signals 1 representing black elementary areas and video signals 0 representing white elementary areas;

b. a memory adapted to store therein said video signals as input pattern information;

c. an input pattern component extracting unit adapted to convert said input pattern information into analog signals representing the peculiar features of said input pattern information;

d. circuit means adapted to establish one-to-one correspondence between said input pattern information and a point in Euclidean space whose coordinates correspond to said analog signals of said input pattern information, and further adapted to obtain the distance DD in said Euclidean space between said input pattern information and a predetermined number of standard patterns for identification of a predetermined number of different input patterns, based upon the following equation:

$$DD = \sum_{i=1}^{J} \frac{|D(i)|}{q(i)}$$

by obtaining a signal representing said distance DD through obtaining the ratio between the absolute value of each signal $D(i)$ and the corresponding signal $q(i)$, where $i-1,2,3, \ldots, J$, and summing the resulting ratios, said signals $q(i)$ representing the standard deviation among the projection of a set of various input patterns of one category upon each of J axes mutually perpendicular on the origin which corresponds to a point of said Euclidean space of a standard pattern of said one category which is established to represent the average of said set of various patterns of said one category, and said signals $D(i)$ representing a projection of said input pattern information upon J axis of coordinates taking an origin from said standard patterns; and e. an output unit adapted to detect the minimum distance among said distances DD obtained by said circuit means, thereby providing the output signal representing a standard pattern corresponding to said minimum distance.

6. A pattern recognition system as defined in claim 5 wherein a. said circuit means for obtaining the distances between said input information pattern and said standard patterns in storage comprises, for each standard pattern, a plurality of J adder-subtractors, each of said adder-subtractors comprising diodes, resistors, an operational amplifier, and reference voltage supply means, each adder-subtractor adapted to obtain the projection of said input pattern information upon a corresponding one of said J axes in said space;

b. means connecting the output of each of said adder-subtractors to one terminal of each of two means adapted to permit the current to flow in one direction only, said two means allowing current flow in opposite directions, each terminal connected to the corresponding adder-subtractor through a common resistor whose value is in proportion to the reciprocal of the corresponding standard deviation $g(i)$;

c. the other terminals of each of said two means adapted to permit the current to flow in one direction only being connected to a respective one of two common connection lines;

d. first output means which is connected to one of said two connection lines and is adapted to provide a positive polarity output voltage in proportion to the sum of the currents flowing into said one of said connection lines from said plurality of adder-subtractors; and e. second output means which is connected to the other connection line and is adapted to provide a positive polarity output voltage in proportion to the sum of the currents flowing into said other connection line from said plurality of adder-subtractors, whereby the distance between said input pattern information and each of said standard patterns may be represented by the sum of said two positive polarity output voltages of said first and second output means of the circuit means corresponding to each of the standard patterns.

* * * * *